Figure 1:
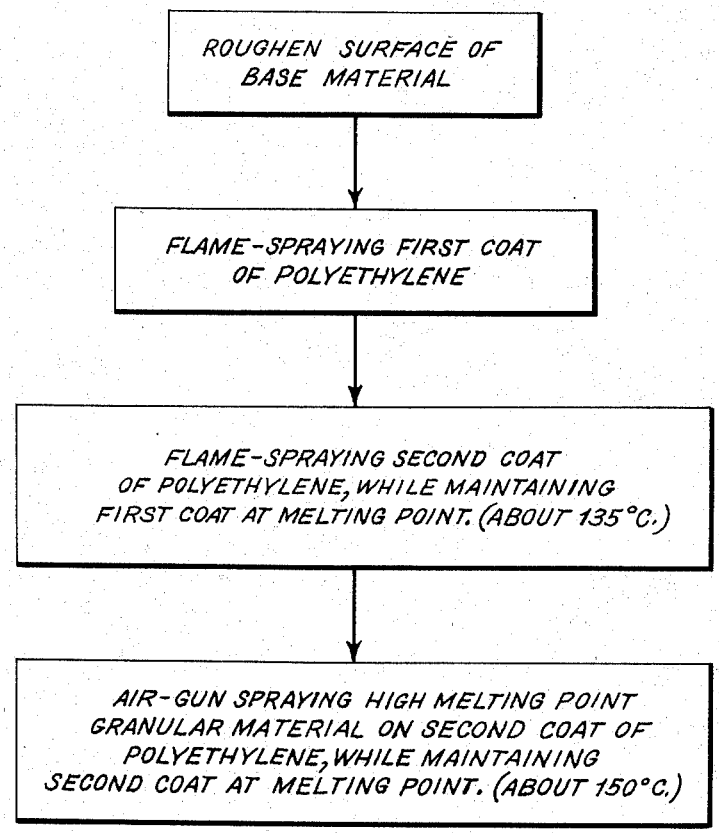

Oct. 6, 1959 C. DUVIVIER 2,907,671
COATING PROCESS
Filed March 21, 1958

INVENTOR
*Charles Duvivier*

BY *Thomas, Weisman & Russell*
ATTORNEYS

2,907,671
COATING PROCESS

Charles Duvivier, Paris, France, assignor of twelve and one-half percent each to John Potter, Paris, France, and George A. Barnes, Potomac, Md.

Application March 21, 1958, Serial No. 722,853

10 Claims. (Cl. 117—16)

This invention relates to a method of coating materials with a protective layer or revetment; the invention more particularly relates to a coating process contemplating adhering to the surface of a given material certain substances having such relatively high melting points that ordinary and known coating procedures are not adaptable thereto. The invention propounds an answer to the problem involved in the adherence of high melting point materials, to be hereinafter more particularly identified, to a given base substance whether the latter be metal, glass or other base material. The high melting point of certain materials, by that very factor, renders difficult if not impossible coating and permanent adherence to the base substance. For example, if the high melting point material decided to be added does not soften except at excessive temperatures, those temperatures would ordinarily interfere with any resinous carrier which might normally be used in the sense that the latter is then subjected to deterioration, as by over polymerization, cracking, or other factors involving decomposition of the carrier. Solvent methods of application also are unusable since such hard, high melting point additives are normally insoluble in the applicable carrier or binder.

It is recognized that spray coating procedures of synthetic plastic or hydrogenous materials are well known and that such materials have been utilized as coatings in a variety of ways. More frequently than not, synthetic plastic or resinous substances have been used to coat different base materials by means of an oxyacetylene powder spray gun, the operation of which depends upon firing the resinous material through a flame projected by such a gun. The temperature of the resinous material is thus raised to its melting point and in its softened condition is thrown against the base material to which it adheres by reason of its inherent plastic condition. A suitable gun for use in such a procedure may be of the type known as the Schori gun, and as exemplified in U.S. Patent No. 2,108,998. Other mechanisms are known for accomplishing a like spray operation, such as the method employing the Norton type spray gun, wherein beads of the coating material are employed, or the methods available through the use of the French SNM spray gun or the American Metco spray gun, both well known devices for this purpose. Alternatively, the coating materials may be dissolved in a solvent or utilized as suspensions of fine particles in alcohol and/or water.

However, in all prior procedures two essential factors have contributed to certain inherent difficulties: firstly, where flame spraying is used extremely hard particles, or substances having a high melting point temperature, cannot be employed as the coating materials. The reason for this is that where relatively high melting point materials are used, the increased temperature necessary to render the same soft or plastic would be so high as to be unattainable in such equipment, or if attainable, so high as to deteriorate or destroy the plastic carrier or binder. Secondly, use of a solvent for coating materials which are practically insoluble presents a practical dilemma rendering such a procedure impossible. To employ methods of suspension or dispersion of such materials also is disadvantageous—such, if possible, are time consuming and elaborate procedures, with no assurance that the coating so applied will achieve that adherence to the base material which is required for certain purposes. As further exemplifying inherent disadvantages of known types of coating procedures, reference is made to such substances as "Teflon," manufactured by the Du Pont Company and chemically identified as tetrafluoroethylene. This composition has remarkable chemical, mechanical and physical properties. No solvent for "Teflon" is known. Chemically, it is impervious to or resists acids. For example, it resists certain types of new fuels such as "Sulfurol," presently used in certain military missiles. And when "Teflon" is applied in accordance with the instant process, the containers for such fuels are capable of fully resisting the corrosive action thereof. Because of these characteristics, tetrafluoroethylene also provides many solutions to friction problems if applied as herein set forth. For example, when cylinders or pistons are coated in accordance with the process of this invention, a bearing surface is presented which will wear over long periods of usage and effectively reduce the amount of oil necessary. Physically, "Teflon" will withstand temperatures as high as 400° C. and as low as −90° C., basic evidence of its broad range of adaptability.

The monochloride compounds or derivatives of tetrafluoroethylene are of the same type as "Teflon," and all are similar in that such are extremely hard synthetics, insoluble within reasonable limits and do not lend themselves either to the flame spray type of coating or to coating procedures involving the dispersion or suspension of such materials in workable solvents. Thus, using these known methods, it has not been possible to obtain continuous, hard and permanent coatings with such materials as "Teflon" or other commercial materials generally sold under the trademark "Hostaflon" or "Kel–F." The latter are similar commercially available synthetic materials which have chemical characteristics similar to tetrafluoroethylene. As stated, the basic reason for the difficulty, where flame spraying is involved (and such may be involved in both procedures just described), is that the material (e.g. "Teflon") must necessarily be subjected to a temperature approximating the temperature of fusion of that material; this being an extremely high temperature, the carrier material or binder will tend to deteriorate, crack or reform thus destroying the effectiveness of the ultimate coating. Practically speaking, coated pieces covered with "Teflon" by way of known practices cannot be heated to temperatures exceeding, for example 350° C., and often such temperatures, in addition, are of an order tending to deteriorate or destroy the piece being coated.

For reasons just recited, and despite efforts of those skilled in the art, it has been impossible by any previously known process to spray inordinately hard, high melting point substances such as "Teflon" upon a base material with any effectiveness or with any resultant durable hard coated, end product.

The basic process constituting this invention may be briefly described as one wherein an initial coating of resinous, relatively low melting point plastic material (for example, polyethylene) is applied in a soft, tacky or plastic condition, one or more coatings of this carrier material being sprayed upon the substance to be coated. Such initial material is maintained at approximately this softening point temperature after application. This is followed by the projection of cold, comminuted or finely ground material on the softened carrier. The ground material is applied in a dry state and in an unheated condition, or at ambient temperatures. This pulverulent coating material is, as stated, generally of an extremely hard type, having a high melting point and exemplified by such compositions as tetrafluoroethylene, the monochloride derivatives thereof, certain polyamides known to the art, or such materials as calcium fluoride, halogenated poly-carbides or various members of the rare earths. Furthermore, it is to be observed that besides the above mentioned polyethylene, identified as being suitable for the initial plastic coating prior to application of the granular material in particle form, other types of resinous materials may be used. For example, certain of the vinyl resins as well as certain types of super polyamides and their derivatives can be utilized in providing the one or more initial plastic coatings provided as the carrier or binder for the ultimate particles to be added. In the application of these initial coatings of the relatively low melting point plastics, it is contemplated that certain thermal hardeners such as the synthetic resins bearing the ethoxy radical can be utilized.

The process is adaptable to many specific uses and several of these are caused to be peculiarly within the contemplation of this invention. For example, the process permits the application of such materials as "Teflon" to obtain a permanent and extremely hard coating of e.g. metals, such coating reducing the friction element, resisting high temperatures and being resistant also to normal corrosive influences. In addition, the procedure is readily adaptable to the metallurgy of uranium. Here the process may be used to obtain protective coatings of calcium or magnesium fluoride on the many types of graphite utensils normally used in uranium metallurgy. In this respect, metallurgists have been unable to solve the problem created by the very high temperatures to which the uranium fluoride ores are carried during a few seconds due to certain calcium reactions. It has thus been impossible to coat the inner walls of such articles, as graphite crucibles, with the aforementioned fluorides in a permanently adherent and satisfactory manner.

Finally, the process is ideally suited to the preparation of such articles as nuclear screens wherein additives to the surface of the base material in a permanent and durable fashion prevent passage of radiation therethrough. In this version of the invention, my process permits application to suitable base materials of such metals as boron or cadmium or the salts of these metals. Despite the relatively high melting points of such substances, the latter can be incorporated in the carrier or resinous material, such as polyethylene, in such fashion as to prevent passage of X-rays or gamma rays or other damaging nuclear particles such as protons or alpha or beta particles.

Having referred to the basic premises of the invention as expressed above, it will be appreciated that the primary object of this invention is to provide a procedure wherein high melting point, extremely hard materials may be applied to given articles by preparing an initial surface coating of one or more layers of hydrogenous material such as propoethylene, and affixing to that surface while such is maintained at softening point temperature the said hard material in cold, dry, granular form. By the term "cold" is here meant temperatures appreciably lower than the temperature of the softened plastic, and preferably, ambient or room temperature.

It is another object of the invention to provide a coating process adaptable to the application of resinous substances such as tetrafluoroethylene which product is unsuitable for use in normal, known, flame spray coating procedures but which, by the step by step method herein set forth, can be applied cold to a softened resinous base coating, thus forming a hard and durable, heat, corrosive and friction resistant coating.

Another object of the invention is the provision of a process whereby certain materials resistant to radio-activity may easily be incorporated in a surface coating of hydrogenous material, such materials being normally insoluble so as not to be subject to the solvent method of coating and such materials normally having such a high temperature softening point as not to be suitable for use in known procedures of coating involving the flame-spraying technique.

It is an additional object of the invention to provide a process for coating materials which enables highly heat resistant substances to be added to the surface of metal objects in such fashion that the ultimate coated surface is rendered impervious or relatively impervious to the otherwise damaging effects of high temperature in the order of 5,000° C. Regarding this aspect, it is contemplated that such coatings are ideally suited as protective coverings for the inner or outer surfaces of high speed missiles where the involved temperatures due to air friction approximate temperatures of the stated order.

It is a further object of the invention to incorporate materials of the type mentioned in cold, dry, powdered form in a plastic resinous base by means of a step by step procedure. In accomplishing the adhesion of the ultimate coating the steps of my process permit application in such a way that a final backing or heating curing step may remove substantially all of the plastic or polyethylene under-coatings, leaving the ultimate and outside layer of extremely hard, high melting point particles firmly adhered to the base material whether it be metal, ceramic or some other organic or inorganic substance with respect to which firm adhesion normally presents a difficult problem.

In addition, a basic advantage and objective of the instant invention is the provision of a procedure which offers many possibilities, i.e., is readily adaptable for the coating of different types of materials and permits the coating of various objects in different although somewhat related fields. For example, as indicated above, the coating procedure of the invention permits the manufacture of laminated materials having incorporated therein an outer coating highly resistant to radiation. Thus the invention permits the manufacture of articles suitable for use in atomic energy and related fields. On the other hand, as to ordinary commercial usages, the same or related procedures permit the application of hard-surfaced coatings to all types of materials which layers, or outside layer, are highly resistant to frictional wear, are extremely hard and permanent, and because of the material utilimately affixed to the surface to be coated, extremely resistant to deterioration by known solvents, high temperatures or other corrosive influences. Thirdly, the invention has direct application to certain fields of use specifically related to the military. For example, in view of the ultimate, effective, coating which may be placed upon a given material, the procedure enables the affixation of a coating or revetment to such articles as the nose of a missile. As is well known, the high speed of such device may, due to frictional contact through the air, induce temperatures of the order of 5,000° C. The coating herein contemplated would probably include certain of the rare earths. Applied to the metallic surfaces of the nose cone of such missiles, and having reference to these extremely hard substances just referred to, such are competent to withstand temperatures of this order.

Having made reference to the foregoing advantages and objectives of the invention, the invention will now be described in more detail.

As indicated above, the problem lies in the inability of known procedures to effectuate the application of extremely hard substances to a given base material. Both flame-spraying as well as solvent techniques are inapt. Neither method permits the direct application of a given hard substance such as those identified in the foregoing. As to these, the required, inordinately high temperatures are practically impossible to obtain. No known solvents are available which would properly perform as to such materials. Thus, when it comes to the use of tetrachloroethylene or "Teflon," neither method is applicable. In practicing my invention, however, cold, solid particles of a material of such a nature may be applied and effectively adhered to the surface of a metal base. This is accomplished by a step by step procedure wherein the first step is the projection, by spraying, of a melted layer of relatively low melting point polyethylene. Such a substance will adhere quite effectively to the metal base under conditions where it is rendered plastic or tacky. This application of a low melting point substance is followed by the projection of a second layer of harder material such as a monochloride derivative of tetrafluoroethylene. Such derivatives are commercially known and available as "Kel-F" or "Hostaflon." This may be projected upon the adhered and soft polyethylene in powder form and cold. This second application of the harder material is followed by a final layer of tetrachloroethylene also projected upon the second layer in powder form and cold. After the final application of "Teflon" in dry powdered form and at ambient temperatures, the final product is heated to a temperature slightly below the melting point of the tetrafluoroethylene.

Figure 2:
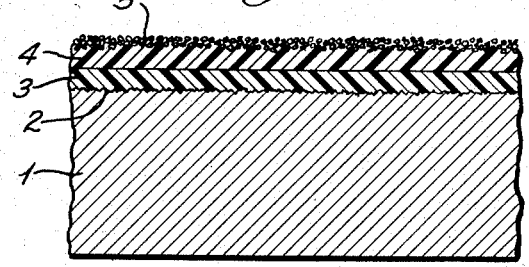

Explanation of one form of the invention is found in the diagrammatic illustrations of the accompanying drawings, wherein:

Figure 1 is a flowsheet or chart representing a four stage procedure, in accordance with the invention, to coat a given base material, and, Figure 2 is a cross-section, greatly enlarged, illustrating the various layers of the coating when applied to a given base material.

Referring to Figure 1, it is seen that the four stages or steps of the inventive procedure comprise: roughening of the surface of the base material; flame spraying a first coating of polyethylene upon the roughened base; flame spraying a second coat of polyethylene while maintaining the first coat at its melting point of approximately 135° C.; and finally, air-gun spraying a high melting point granular material upon this second coat of polyethylene while maintaining such second coat at its respective melting point which, in this illustrated example, is about 150° C.

The complete, coated material is represented diagrammtically in Figure 2 where the base material is shown at 1. This may be either metal or non-metal, the procedure being applicable to almost any type of base material. At any rate, the latter is first roughened as by sanding or other abrasive treatment and as indicated at 2. The first coat 3 of polyethylene is then applied to this roughened base material. The second coat 4 is applied to the first coat while the latter is maintained at its respective melting point. Finally, the granular material, in dry powdered form and of the type herein specified, indicated at 5, is sprayed by means of an air gun to the softened polyethylene 4 while such layer 4 is mounted at a somewhat higher melting point, in this form of the invention, a melting point of about 150° C.

As indicated above, the cross-section of Figure 2 is greatly enlarged, diagrammatic in nature, and is included herein for illustrative purposes only.

In the manner described, it is thus possible to affix to either a metallic or graphite support these extremely hard materials which cannot be sprayed upon hot by the ordinary flame spray method. The fact that the melting point thereof is extremely high or that such materials are relatively insoluble is of no moment insofar as this process be concerned, for such materials are comminuted or finely ground and applied in a relatively cold and dry condition.

The particles which are so applied may be ground to approximately 150 mesh size or finer, the determining factor being the type of hard material being utilized as well as the purpose for which the ultimate product is designed. In addition, the entire laminated structure, after coating by the two or more step process just referred to, can be subjected to a suitable thermal treatment, as by firing or baking. This is carried out at a temperature sufficiently high to produce both the additional adherence of the ground, powdered substance and the partial or total elimination of the thermal plastic matter used as the carrier or supporting medium for these finely ground particles.

The initial coat (or coatings) of polyethylene in softened form is accomplished by the use of an oxyacetylene flame spray gun following a procedure well known to the prior art. The polyethylene used in the initial application is one of rather low molecular weight having a melting point in the neighborhood of approximately 135° C. Using a flame spray gun of, e.g., the Schori type, the temperature at which this first coat is applied approximates this melting point and is maintained at this point, as by heating the base material, during the projection of a higher molecular weight polyethylene having for example a melting point of about 140° C. to 160° C. Similarly, while the second coat is maintained in a softy, pasty condition at a temperature of about 150° C. the final hard, granulated substance, such as "Teflon" powder, is applied by the use of an air vaporizer. The nearly melted polyethylene of the second application may be simultaneously applied through the use of the usual flame-spray gun. The final surface which is obtained consists of a coating of finely ground "Teflon" or tetrafluoroethylene. The intermediate layers of lower melting point polyethylene derivatives can be partially or totally eliminated by submitting this ultimate surface of the coating to a temperature close to the temperature of the "Teflon." In any event, the important fact is that the metal base has upon its surface the "Teflon" particles which are either in a pure state or are slightly mixed with the previously melted polyethylene derivative which acts as a binder for such particles.

Reference will now be made to several specific examples demonstrating the alternative procedures which may be used. Such examples are intended to be typical only, other equivalent operations for slightly different purposes being readily appreciated by those skilled in the art.

*Example I*

In this example, the objective was to obtain a calcium fluoride protective coating on certain graphite articles such as the crucibles used in uranium production installations. This halogen salt as well as other chemically equivalent salts melt only at very high temperatures. In fact such temperatures may approximate between 1500° C. and 1800° C. Hence, it is impossible to employ any flame spraying procedures to achieve a melting of such materials in order to project them by such known procedures upon the base object.

In the present example, a coating of polyethylene having a melting point of approximately 135° C. was projected with a flame-spray gun upon a piece of graphite, here a graphite crucible.

While this object was maintained at a temperature slightly above the stated softening point of the polyethylene, e.g., 130° C. pulverulent or ground calcium fluoride in a dry state and at ambient temperature was simultaneously projected upon the softened polyethylene by means of a suitable vaporizer or particle spray gun. This application of the calcium fluoride was continued until the same obtained a thickness of approximately two millimeters.

In the next step, the crucible was maintained at a substantially higher temperature of about 250° C. which resulted in the elimination of a part of the initial coating of polyethylene. However, its presence assured the affixation to the base material, the crucible, of the finely ground calcium fluoride particles. These were found to be in firm cohesion with the graphite article. The crucible was thus surfaced with a highly resistant coating of the identified salt.

Example II

Here the objective was to obtain a revetment or coating of tetrafluoroethylene or one of its monochloride derivatives on a piece of sheet steel, the inadequacy of normal procedures being the difficulty of reducing such a substance ("Teflon") to the fluid condition necessary to permit its melting or softening and adherence to the base material. At any rate, in following the present procedure, a coating of polyethylene was first projected on the surface of the metallic base by flame spraying, thus raising the temperature of the polyethylene to its melting point of approximately 135° C. While maintained at this temperature or at a slightly higher temperature than such melting point an intermediate coating of a polyethylene derivative of higher molecular weight and having a melting point somewhat above 150° C. was applied. The sheet metal piece was raised to the last given temperature and maintained at the same during the addition of a monochloride derivative of tetrafluoroethylene known on the market as "Hostaflon." This was projected, as in the other example, in a finely ground, solid, dry and cold state. The addition of this final substance was followed by heat treatment for a period of 15 minutes, during which a temperture in excess of 250° C. was maintained. Such temperature was intermediate the melting point of the "Hostaflon" and the particular polyethylene derivative used. It was found that the uniformity of the coating thus obtained was excellent and the thickness sufficient to accomplish the purposes outlined in the foregoing.

In the instant case the final cooking or heat treatment was deemed unnecessary for the same is not required in any instance in which the presence or absence of the initial polyethylene coating is of no consequence.

Example III

In this example, an oxyacetylene flame spray gun was employed to project a lower melting point polyethylene derivative in melted form upon the base object of graphite as an initial coating. This was thusly adhered as an initial layer, such derivative being one having a melting point in the neighborhood of 135° C. The initial first coat of this material was maintained at approximately this same temperature and during such period of temperature control, a second coating was projected, through use of the spray gun, of a higher molecular weight polyethylene. In this operation, the latter substance was of that type having a melting point of about 150° C. During the period of time that this second coat was maintained in a soft, pasty condition, at a temperature of about 140° C. and through the use of a suitable and known powder spray mechanism such as an air vaporizer, a coating of cold "Teflon" or tetrafluoro-ethylene ground to about 150 mesh or finer was applied. The result was to obtain a tightly adhered coating or surface of finely ground "Teflon" and the polyethylene derivative. The latter was eliminated by submitting the surface of the coating to temperature approximating the temperature of fusion of "Teflon" (about 400° C.). Thus, the surface of the coated object consisted entirely of "Teflon" in a pure state, or "Teflon" having slightly mixed therewith a small portion of the lower melting point polyethylene derivative, the latter acting as a binder or carrier for the tetrafluoroethylene particles.

Example IV

Much the same procedure as outlined above can be used to coat the interior walls of, e.g., the fuel tank of a guided missile. In the operation of such devices, temperatures in order of 5,000° C. may be encountered. Here, a low melting point polyethylene of that type identified in the foregoing may at first be applied to the interior walls of the metal fuel tank. This is followed by a series of gradually higher melting points polyethylene derivatives all of which can be chosen specifically by those skilled in the art merely by reference to their respective molecular weights and consequent higher melting points as such weights increase. The successive coatings are applied while the preceding coating is maintained at an elevated temperature approximating the melting point of the material flame-sprayed on by such previous coat.

After several coatings of this series of polyethylene derivatives have been made, all through use of a flame spray gun, and while the last coat is maintained at a temperature slightly in excess of the melting point of the material of that coat, granulated rare earths are sprayed upon the last polyethylene material. However, they may be applied in accordance with my invention when projected as solid ground particles of ambient temperature. Preceding coats during such projection are maintained plastic as in the preceding examples by the elevation of the temperature thereof to the melting point or near melting point of the coat just applied before the particle application. Through the method of application described in this example, the surface of the fuel tank so-coated is rendered impervious to temperatures of the highest order, here contemplated as being in the neighborhood of 5,000° C. This result is achieved even though such temperature range exceeds substantially the melting or softening point temperature of the rare earths which have been incorporated in the final coating.

Example V

In this operation, a revetment or coating is obtained wherein the active and important ingredient of same is a substance effective to prevent penetration of radio-active particles. Here the final application consists of projecting ground, solid particles of such substances as boron carbide, the fluorides of boron, or the halogen salts of either boron or cadmium, such salts being resistant to the penetration of radio-active particles.

In applying such materials, the procedure followed that described in Example III, supra.

An initial coating of lower melting point polyethylene was applied by means of an oxyacetylene flame spray gun upon the object desired to be used as a radio-active shield or equivalent article. This initial coating was followed by a second application or projection of a higher molecular weight polyethylene through the use of the same type spray gun. The respective temperatures of the first and second coatings were those set forth in Example III.

While the second coating was maintained at a temperature of about 140° C., the final application was made. Here instead of applying "Teflon" as per Example III, finely ground boron carbide was projected upon the previous linings of soft plastic material through use of the referred to air vaporizer.

The result was to have closely bound to the base material of the shield a final coating of this boron salt which was fully resistant to radio-activity. Actually, in carrying out this example, the boron carbide was applied to such extent that the final article contained six kilograms of such substance to the square meter of base article. The relative thickness of the application was approximately one centimeter.

It should further be observed that application in this manner permitted the coating of such radio-active resistant material to any object despite unevenness or irregularity of shape. As a matter of fact, this is true also with respect to any of the coatings referred to throughout the other examples.

Other equivalent hard and high melting point solid particles specifically not identified in the foregoing can be applied to a given base material in the same manner. When referring to the projection of such particles, I have given but a few typical examples, it being understood that the process of this invention is inclusive of any type of hard granular material not ordinarily susceptible to known flame spray or solvent methods of coating. The important variance of this invention, therefore, over the usual coating procedures employing resinous or synthetic materials is that here the application of the final hard and resistant material is accomplished while the latter is cold, at ambient temperature, in granular form, and unchanged chemically or physically except for its described pulverulent state.

It can be appreciated that if the temperature of a flame spray gun could conceivably be raised to the melting point temperatures of such extremely hard additives, these temperatures would be so excessive as to either destroy the undercoating or plastic carrier or change the chemical characteristic of the additive, i.e., the granular powder. A like difficulty presents itself as to any procedure contemplating solvent coating of such materials as "Teflon," "Hostaflon" or other similar monochloride derivatives of polyethylene. Such applies also to certain fluorides of the alkali metals or alkali earth metals such as calcium fluoride. Additional substances such as the rare earths exemplify materials which are resistant to almost all known solvents, and which, having extremely high melting point temperatures cannot be softened for normal, plastic application by flame spraying or equivalent techniques incapable of reaching these required temperatures.

At any rate, by my method of application, involving the projection of such hard particles, I have achieved their firm and permanent addition to any type of surface without destruction or impairment of either the base binder or carrier material or without alteration of the physical or chemical characteristics of these additives themselves.

I claim:

1. A process for coating a material with a high melting point compound comprising: applying a low melting point polyethylene by flame-spraying said polyethylene upon said material, maintaining the applied polyethylene at a temperature of at least said last-named low melting point temperature, projecting said high melting point compound against said applied polyethylene while said applied polyethylene is maintained at at least its softening point temperature, said high melting point compound being cold and in fine granular form during said projecting step, whereby said compound is firmly adhered to the surface of said material by said polyethylene.

2. A process in accordance with claim 1 wherein the high melting point compound is tetrafluoroethylene.

3. A process in accordance with claim 1 wherein the high melting point compound is a rare earth.

4. A process in accordance with claim 1 wherein the high melting point compound is a halogen salt of boron.

5. The product produced by the process of claim 1.

6. A process for coating a material with a high melting point compound comprising: applying a polyethylene by flame-spraying said polyethylene upon said material, said polyethylene having a melting point of about 135° C., maintaining the applied polyethylene at a temperature of at least about 135° C., projecting said high melting point compound against said applied polyethylene while said applied polyethylene is maintained at at least its softening point temperature, said high melting point compound being cold and in fine granular form during said projecting step, whereby said compound is firmly adhered to the surface of said material by said polyethylene.

7. A process for coating a material with a high melting point compound comprising: applying a first coating of low melting point polyethylene by flame-spraying said polyethylene upon said material, maintaining said first coating at a temperature of at least said low melting point temperature, applying a second coating of polyethylene having a melting point higher than said first coating of polyethylene, projecting a third compound having a melting point substantially higher than said first and second coatings against said first and second coatings of polyethylene while said coatings are maintained at a temperature of at least as high as the softening point of said second polyethylene coating, said third compound being cold and in fine granular form during said projecting step, whereby said compound is firmly adhered to the surface of said material by said first and second polyethylene coatings.

8. A process for coating a base material comprising: applying polyethylene having a melting point below 150° C., by flame-spraying said polyethylene upon said material, maintaining the applied polyethylene at a temperature of at least said melting point temperature, projecting a high melting point compound against said applied polyethylene while said applied polyethylene is maintained at at least its softening point temperature, said compound having a melting point above 350° C., said high melting point compound being cold and in fine granular form during said projecting step, and baking said material, said polyethylene and said compound at a temperature of about 250° C. to remove excess polyethylene, whereby said compound is firmly adhered to the surface of said material by said polyethylene.

9. A process for coating a material with a high melting point compound comprising: applying a low melting point polyethylene derivative by flame-spraying said polyethylene upon said material, maintaining said material and the applied polyethylene at a temperature of at least said low melting point temperature, projecting said high melting point compound by means of an air vaporizer against said applied polyethylene while said applied polyethylene is maintained at at least its softening point temperature, said high melting point compound being at ambient temperature, dry, and in fine granular form during said projecting step, whereby said compound is firmly adhered to the surface of said material by said polyethylene applied low melting point.

10. A process for coating a base material comprising: applying a first coating of polyethylene having a melting point below about 135° C. by flame-spraying said polyethylene upon said material, maintaining the applied polyethylene at a temperature of at least said melting point temperature, projecting a second polyethylene compound having a melting point of about 150° C. against said first coating while said first coating of polyethylene is maintained at at least its softening point temperature, said second polyethylene compound being in dry, granulated form, raising to and maintaining said material, said first polyethylene coating and said second polyethylene compound at the melting point temperature of said second compound, and projecting by an air vaporizer a third compound having a melting point temperature of above 350° C., said third compound being at ambient temperature and in fine granular form during said projecting step, whereby said third compound is firmly adhered to the surface of said material by said first and second coatings of said respective polyethylenes.

References Cited in the file of this patent

UNITED STATES PATENTS 2,663,652    Railing  ------------ Dec. 22, 1953
2,706,936    Willson  ----------- Apr. 26, 1955